(12) United States Patent
Cooley

(10) Patent No.: US 8,893,114 B1
(45) Date of Patent: Nov. 18, 2014

(54) SYSTEMS AND METHODS FOR EXECUTING A SOFTWARE PACKAGE FROM WITHIN RANDOM ACCESS MEMORY

(71) Applicant: Symantec Corporation, Mountain View, CA (US)

(72) Inventor: Shaun Cooley, El Segundo, CA (US)

(73) Assignee: Symantec Corporation, Mountain View, CA (US)

( * ) Notice: Subject to any disclaimer, the term of this patent is extended or adjusted under 35 U.S.C. 154(b) by 0 days.

(21) Appl. No.: 14/020,413

(22) Filed: Sep. 6, 2013

(51) Int. Cl.
  *G06F 9/44* (2006.01)
  *G06F 9/445* (2006.01)

(52) U.S. Cl.
  CPC ... *G06F 8/60* (2013.01); *G06F 8/65* (2013.01)
  USPC ............ 717/173; 717/168; 717/169; 717/174

(58) Field of Classification Search
  CPC ................. G06F 8/60; G06F 8/61; G06F 8/65
  See application file for complete search history.

(56) References Cited

U.S. PATENT DOCUMENTS

| | | | | |
|---|---|---|---|---|
| 7,703,091 | B1 * | 4/2010 | Martin et al. ................. | 717/174 |
| 7,814,474 | B2 * | 10/2010 | Chen et al. .................... | 717/168 |
| 7,836,444 | B2 * | 11/2010 | Kim ............................... | 717/173 |
| 8,214,825 | B2 * | 7/2012 | Tolmie .......................... | 717/174 |
| 8,286,158 | B2 * | 10/2012 | Hamid et al. ................. | 717/174 |
| 8,332,840 | B2 * | 12/2012 | Zou et al. ...................... | 717/173 |
| 8,347,281 | B2 * | 1/2013 | Arsenault et al. ............. | 717/168 |
| 2008/0098160 | A1 * | 4/2008 | Slyz et al. ..................... | 711/103 |
| 2009/0119659 | A1 * | 5/2009 | Zou et al. ...................... | 717/173 |
| 2013/0024850 | A1 * | 1/2013 | Nutaro et al. ................. | 717/169 |

OTHER PUBLICATIONS

Wang et al., TreeFTL: efficient RAM management for high performance of NAND flash-based storage systems, Mar. 2013, 6 pages.*
Doh et al., Exploiting non-volatile RAM to enhance flash file system performance, Sep. 2007, 10 pages.*
Debian; ramfs; Wiki; https://wiki.debian.org/ramfs; as accessed on Jun. 29, 2013.
Ramesh Natarajan; Overview of RAMFS and TMPFS on Linux; http://www.thegeekstuff.com/2008/11/overview-of-ramfs-and-tmpfs-on-linux/; Nov. 6, 2008.

* cited by examiner

*Primary Examiner* — Thuy Dao
(74) *Attorney, Agent, or Firm* — ALG Intellectual Property, LLC

(57) ABSTRACT

A computer-implemented method for executing a software package from within random access memory may include (1) identifying a computing device that contains both random access memory and firmware updatable read only memory, (2) providing a network accessible software package repository, (3) providing a download agent within the firmware updateable read only memory, the download agent being programmed to, (4) create a working area within the random access memory by emulating persistent storage, (5) access the software package repository through a network connection to extract a software package, and (6) execute the software package in the working area of the random access memory that emulates persistent storage. Various other methods, systems, and computer-readable media are also disclosed.

20 Claims, 5 Drawing Sheets

SYSTEMS AND METHODS FOR EXECUTING A SOFTWARE PACKAGE FROM WITHIN RANDOM ACCESS MEMORY

BACKGROUND

Individuals and organizations often connect their computing devices to a network, such as the Internet, through a gateway. Examples of gateways may include cable modems, Digital Subscriber Line (DSL) modems, wireless routers, network switches, and/or wireless access points. A gateway may connect one computing system or network to another network (i.e., a network that uses a different networking protocol). Gateway devices may also provide some security features, such as a firewall.

Conventional gateways may be limited (i.e., for reasons related to design or cost) to storing software as firmware within read only memory (ROM). The ROM may allow for updates to the firmware of a gateway, which may involve rebooting the gateway. A reboot operation may cause a gateway to break any existing Internet connection. Moreover, a security software vendor may not be able to update gateway firmware on a ROM without extensive collaboration with a vendor of the gateway vendor. These limitations in regard to updating software on a ROM with software from a third-party vendor become especially problematic for security software that involves, or benefits from, multiple updates per day.

Accordingly, the instant disclosure identifies and addresses a need for additional and improved systems and methods for executing a software package from within random access memory.

SUMMARY

As will be described in greater detail below, the instant disclosure generally relates to systems and methods for executing a software package from within random access memory by providing a download agent within a ROM device in a computing system. The download agent may extract a software package from an online software package repository. The download agent may also execute the software package within a working area of random access memory within the computing system.

In one example, a computer-implemented method for executing a software package from within random access memory may include identifying a computing device that contains both random access memory and firmware updatable read only memory. The method may further include providing a network accessible software package repository. Additionally, the method may include providing a download agent within the firmware updateable read only memory. The download agent may be programmed to create a working area within the random access memory by emulating persistent storage. The download agent may also be programmed to access the software package repository to extract a software package. The download agent may further be programmed to execute the software package in the working area of the random access memory that emulates persistent storage.

In one embodiment, the computing device may be configured without writable auxiliary memory. In some examples, executing the software package in the working area of the random access memory that emulates persistent storage may include updating a security software package.

In one embodiment, writing to the firmware updatable read only memory may include (1) booting the computing device and (2) extracting the software package and executing the software package in the working area of the random access memory without rebooting the computing device. In addition, the steps of extracting the software package and executing the software package in the working area of the random access memory may be performed without breaking the network connection.

In one embodiment, the computing device may include a network gateway. In addition, the download agent may be programmed to access the software package repository through the network connection to extract the software package upon the computing device being booted.

In one embodiment, the download agent may be programmed to emulate persistent storage at least in part by creating a file system in the random access memory. In addition, the download agent may be programmed to access the software package repository through the network connection to extract the software package by transmitting a request to the software package repository. In such embodiments, the request may include an identifier of a model of the computing device, and the method may further include selecting the software package, based on the identifier of the model, from a plurality of software packages at the software package repository.

In at least one embodiment, the download agent may be programmed to block at least some traffic on the network through the computing device until the software package begins executing in the working area of the random access memory that emulates persistent storage. In addition, the computing device may be configured to provide a user interface where a user can configure settings for the computing device, and the settings may indicate how the computing device will respond when the download agent fails to download the software package from the software package repository.

According to various embodiments, a system for implementing the above-described method may include an identification module that identifies a computing device that contains both random access memory and firmware updatable read only memory. The system may also include a provisioning module that provides a network accessible software package repository and that provides a download agent within the firmware updateable read only memory. The download agent may be programmed to create a working area within the random access memory by emulating persistent storage, to access the software package repository to extract a software package, and to execute the software package in the working area of the random access memory. In addition, the system may include at least one processor configured to execute the identification module and the provisioning module.

In some examples, the above-described method may be encoded as computer-readable instructions on a computer-readable-storage medium. For example, a computer-readable-storage medium may include one or more computer-executable instructions that, when executed by at least one processor of a computing system, may cause the computing system to (1) identify a computing device that contains both random access memory and firmware updatable read only memory, (2) provide a network accessible software package repository, and (3) provide a download agent within the firmware updateable read only memory.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification.

Together with the following description, these drawings demonstrate and explain various principles of the instant disclosure.

Figure 1:
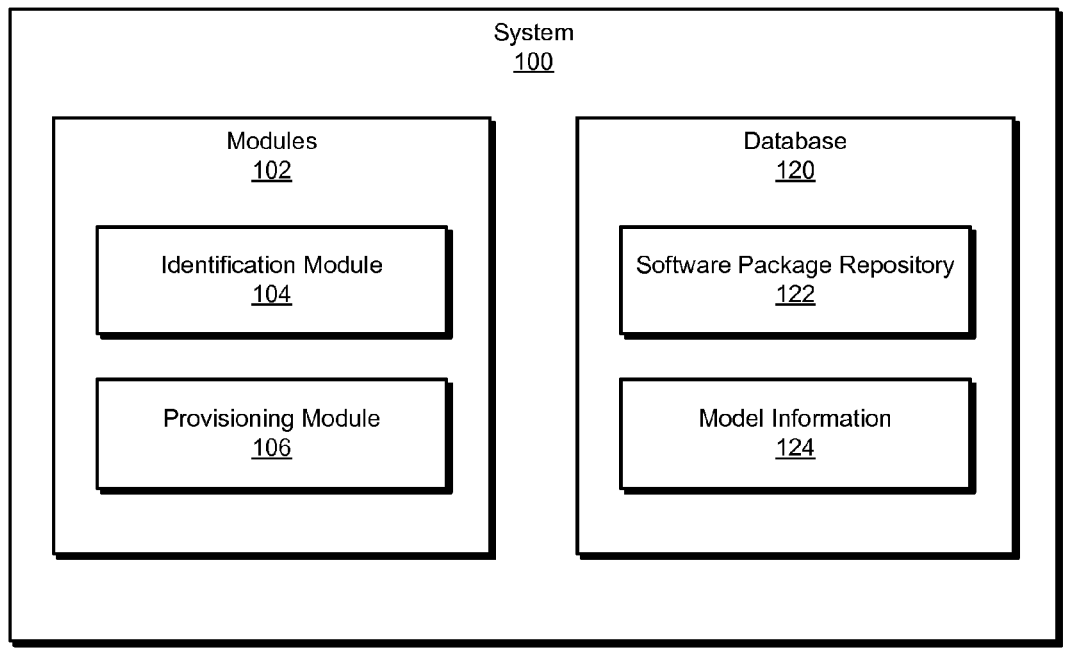
FIG. 1 is a block diagram of an exemplary system for executing a software package from within random access memory.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents and alternatives falling within the scope of the appended claims.

DETAILED DESCRIPTION OF EXEMPLARY EMBODIMENTS

The present disclosure is generally directed to systems and methods for executing a software package from within random access memory. Embodiments of the instant disclosure may provide a software delivery mechanism that provisions a download agent in firmware updatable read only memory of a device (e.g., a gateway). The agent may be responsible for downloading and installing, in random access memory of the device, a software package (e.g., the remainder of a product offering for the device).

Embodiments of the instant disclosure may be particularly useful for providing updates to network devices, such as gateways. For example, the systems described herein may install (e.g., during or after a manufacturing process) a download agent to read only memory of a gateway device. The download agent may have network access to a remote repository of network packages (e.g., security updates) that were not pre-installed on the gateway device (e.g., network packages that were not available during a manufacturing process, packages that include periodic updates, etc.). The download agent may be responsible for creating a working area for the available packages by emulating persistent storage in random access memory of the gateway device. The download agent may then download and extract any available software packages to the working area and start the packages to enable them to execute from the gateway device.

As will be explained in greater detail below, the systems and methods disclosed herein may enable a software vendor to efficiently and effectively update software in a computing system, such as a gateway device, on an as-needed basis (e.g., multiple times per day). The systems and methods disclosed herein may also enable the software vendor to update the computing system without rebooting the system or breaking a network connection of the system. Embodiments of the instant disclosure may also provide various other features and advantages.

Figure 2:
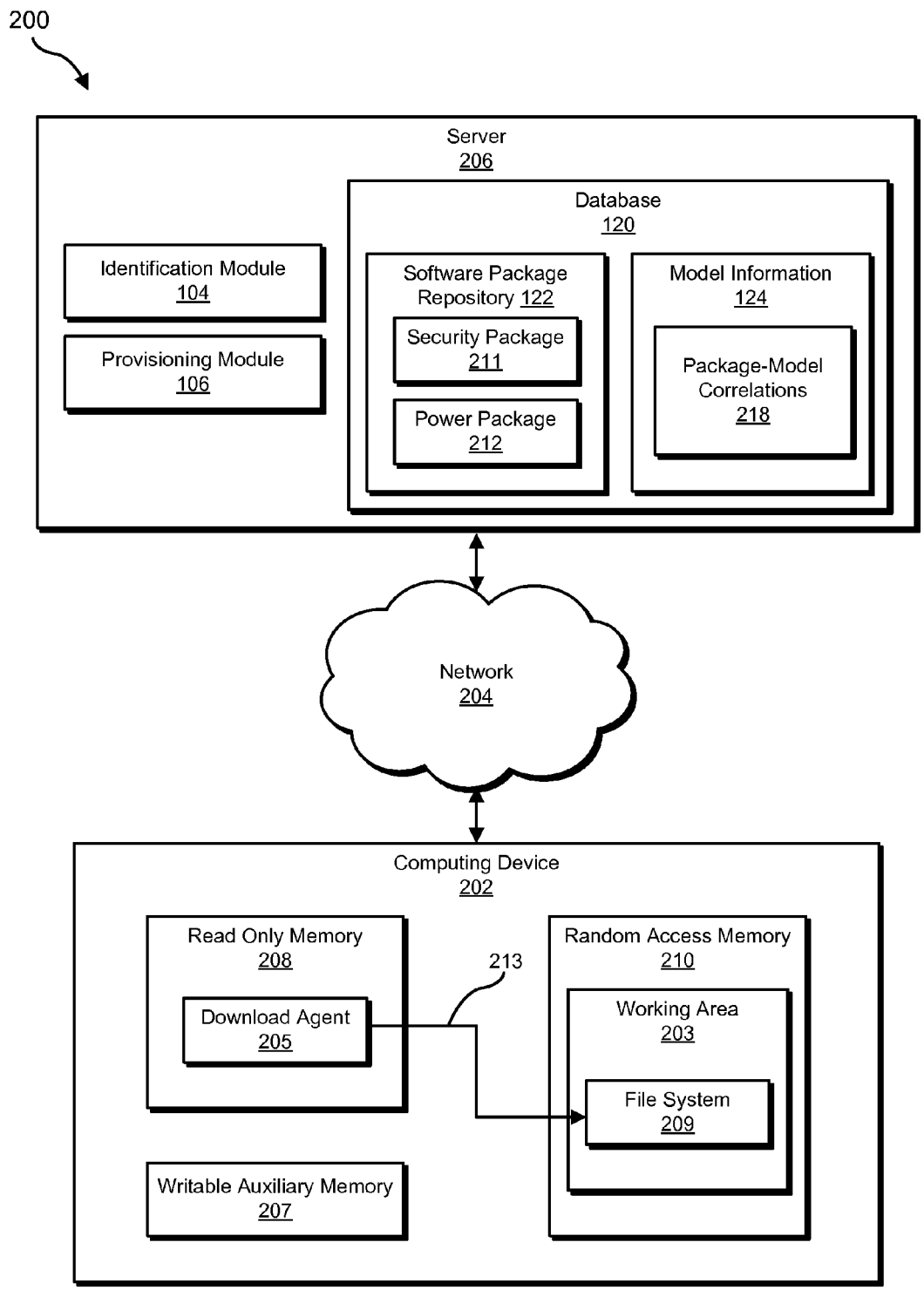
FIG. 2 is a block diagram of an exemplary network-based implementation of a system for executing a software package from within random access memory.

The following will provide, with reference to FIGS. 1-2, detailed descriptions of exemplary systems for executing a software package from within random access memory. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 4 and 5, respectively.

FIG. 1 is a block diagram of exemplary system 100 for executing a software package from within random access memory. As illustrated in this figure, exemplary system 100 may include one or more modules 102 for performing one or more tasks. For example, and as will be explained in greater detail below, exemplary system 100 may include an identification module 104 that may identify a computing device that contains both random access memory and firmware updatable read only memory. Exemplary system 100 may additionally include a provisioning module 106 that may provide a network accessible software package repository.

Provisioning module 106 may further provide a download agent within the firmware updateable read only memory. The download agent may be programmed to create a working area within the random access memory by emulating persistent storage, to access the software package repository through the network connection to extract a software package, and to execute the software package in the working area of the random access memory that emulates persistent storage. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 410 in FIG. 4, and/or portions of exemplary network architecture 500 in FIG. 5. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store a software package repository 122. Software package repository 122 may include one or more software packages for download by client machines, as discussed further below. Software package repository 122 may be capable of responding to requests for software packages by delivering requested binaries. In some embodiments, software package repository 122 may also distinguish between requests from varying endpoints. For example, model A of a gateway may receive one package while model B may receive a different package.

Database 120 may also be configured to store model information 124. Model information 124 may contain information about models of various computing devices, such as gateways. The systems and methods described herein may use model information 124 to select appropriate software packages from software package repository 122 for download, as discussed further below.

Database 120 may represent portions of a single database or computing device or a plurality of databases or computing devices. For example, database 120 may represent a portion of server 206 in FIG. 2, computing system 410 in FIG. 4, and/or portions of exemplary network architecture 500 in FIG. 5. Alternatively, database 120 in FIG. 1 may represent one or more physically separate devices capable of being accessed by a computing device, such as server 206 in FIG. 2, computing system 410 in FIG. 4, and/or portions of exemplary network architecture 500 in FIG. 5.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204. As shown in FIG. 2, server 206 may be programmed with one or more of modules 102 and/or may store all or a portion of the data in database 120. Additionally or alternatively, computing device 202 may be programmed with one or more of modules 102 and/or may store all or a portion of the data in database 120.

In one embodiment, one or more of modules 102 from FIG. 1 may, when executed by at least one processor of computing device 202 and/or server 206, enable computing device 202 and/or server 206 to execute a software package from within random access memory. For example, and as will be described in greater detail below, identification module 104 may be programmed to identify computing device 202, which contains both firmware updatable read only memory 208 and random access memory 210.

As used herein, the phrase "firmware updatable read only memory" may refer to computer storage that is generally read only yet permits firmware updates. Updating firmware updatable read only memory may involve rebooting computing device 202 and/or writing the entire space of the read only memory, both of which may be slow or undesired in comparison to other forms of memory.

As used herein, the phrase "random access memory" generally refers to computer storage that enables stored data to be accessed directly in random order. Random access memory may include volatile memory. Information stored in volatile memory may be lost if the memory loses power.

Provisioning module 106 may be programmed to provide network accessible software package repository 122 (e.g., accessible via network 204). Provisioning module 106 may also be programmed to provide a download agent 205 within firmware updateable read only memory 208. The functionality of provisioning module 106 (providing a repository and provisioning a download agent) may be provided in a single application or system. Alternatively, provisioning module 106 may include code that executes in different processes, applications, and/or systems.

Download agent 205 may be programmed to create a working area 203 within random access memory 210 by emulating persistent storage (e.g., by creating a file system 209 within working area 203 of random access memory 210). As used herein, the phrase "working area" may refer to an area of random access memory that is partitioned, created, or reserved for working as an emulator of persistent storage, as further discussed below. Moreover, as used herein, the phrase "persistent storage" may refer to any storage that is generally persistent and/or stable despite disturbances or disconnections of a power supply. Persistent storage may therefore be contrasted with random access memory, which is generally not persistent.

Download agent 205 may be further programmed to access software package repository 122 through network 204 to extract a software package. As shown in FIG. 2, software package repository 122 may include an exemplary security package 211 and an exemplary power package 212. Security package 211 may include any type or form of code or data that provides one or more security functions for computing device 202. For example, security package 211 may include a security patch, a security update, a firewall whitelist or blacklist update, and/or any other data or code related to the security of computing device 202. Power package 212 may include any type or form of code or data that provides one or more power functions for computing device 202.

Download agent 205 and/or provisioning module 106 may be programmed to select one or more packages from software package repository 122 using model information 124, which may include package-model correlations 218 (as further discussed below for FIG. 3). For example, download agent 205 and/or provisioning module 106 may select a software package in part by matching a particular model or type of computing device 202 to one or more software packages, as correlated within package-model correlations 218.

Furthermore, download agent 205 may be programmed to execute the software package in working area 203 of random access memory 210. In the example of FIG. 2, computing device 202 may be entirely or partially manufactured within a manufacturing center, which may place download agent 205 within read only memory 208, as discussed further below.

Computing device 202 may also optionally include writable auxiliary memory 207. Writable auxiliary memory may be an example of persistent storage. As used herein, the phrase "writable auxiliary memory" may refer to a unit of secondary memory, as opposed to primary memory, which may enable read/write operations at a higher volume, frequency, and practicality than read only memory 208. Writing to firmware updatable read only memory may involve booting the computing device, writing the entire read only memory, and/or breaking an Internet connection, in addition to writing at a slower speed than writing to auxiliary memory. Writable auxiliary memory may not have these limitations and may enable faster and/or more frequent writing.

Writable auxiliary memory 207 may not be included in some computing devices. For a device that lacks writable auxiliary memory, the systems and methods herein may effectively compensate for that lack by emulating auxiliary or persistent storage within random access memory 210. As a result, while computing device 202 remains powered and booted, random access memory 210 may effectively function as writable auxiliary memory (indeed, random access memory 210 may perform even faster than disk drives and other forms of writable auxiliary memory).

Computing device 202 generally represents any type or form of computing device capable of reading computer-executable instructions. Examples of computing device 202 include, without limitation, workstations, laptops, client-side terminals, servers, distributed computing systems, mobile devices, network switches, network routers (e.g., backbone routers, edge routers, core routers, mobile service routers, broadband routers, etc.), network appliances (e.g., network security appliances, network control appliances, network timing appliances, SSL VPN (Secure Sockets Layer Virtual Private Network) appliances, etc.), network controllers, gateways (e.g., service gateways, mobile packet gateways, multi-access gateways, security gateways, etc.), combinations of one or more of the same, exemplary computing system 410 in FIG. 4, or any other suitable computing device. As used herein, the term "gateway" generally refers to any type or form of computing device with two (or more) network ports, where network traffic received on one port transits the CPU and continues over the other port, and vice versa.

Server 206 generally represents any type or form of computing device that is capable of storing a software package repository that provides software to client devices. Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 500 in FIG. 5, or the like. Network 204 may facilitate communication or data transfer using wireless or wired connections. In one embodiment, network 204 may facilitate communication between computing device 202 and server 206.

Figure 3:
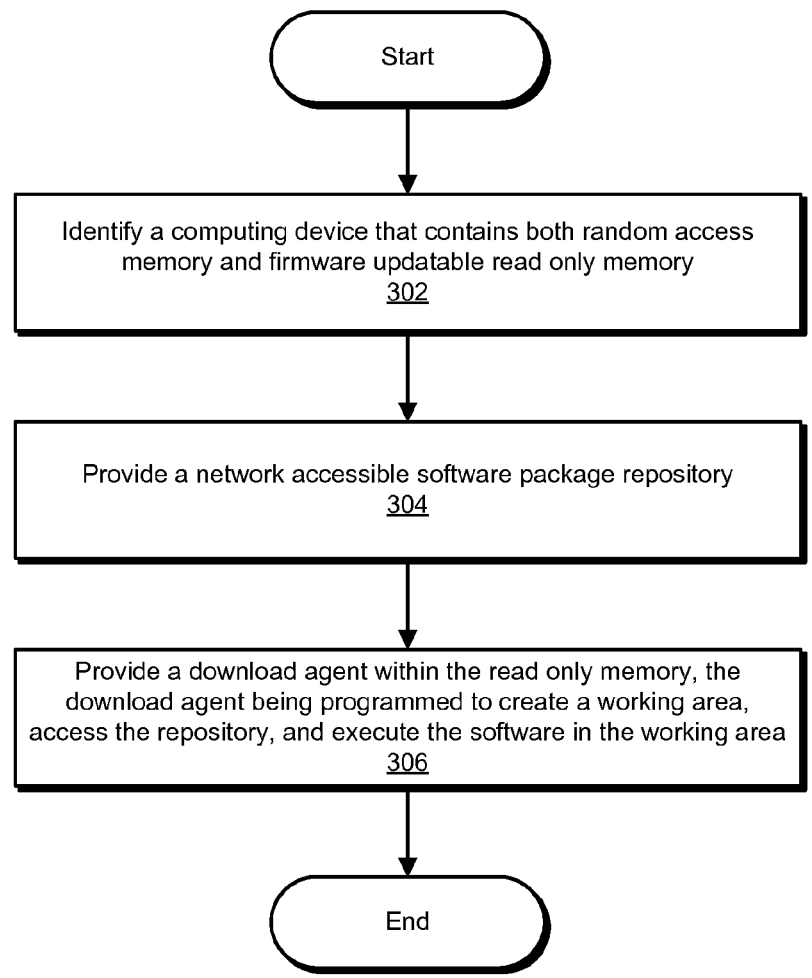
FIG. 3 is a flow diagram of an exemplary method for executing a software package from within random access memory.

FIG. 3 is a flow diagram of an exemplary computer-implemented method 300 for executing a software package from within random access memory. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 410 in FIG. 4, and/or portions of exemplary network architecture 500 in FIG. 5.

As illustrated in FIG. 3, at step 302 one or more of the systems described herein may identify a computing device that contains both random access memory and firmware updatable read only memory. For example, at step 302 identification module 104 may, as part of computing device 202 in FIG. 2, identify computing device 202, which contains both random access memory 210 and firmware updatable read only memory 208.

Identification module 104 may identify computing device 202 in a variety of manners. Identification module 104 may receive user or manual input that indicates, identifies, and/or selects computing device 202. Identification module 104 may also identify computing device 202 based on any suitable criteria. The criteria may include an indication that computing device 202 needs, requests, and/or would benefit from download agent 205 and/or software from software package repository 122. The criteria may also include determining the presence or absence of writable auxiliary memory in computing device 202.

Identification module 104 may identify computing device 202 at any suitable time. For example, identification module 104 may identify computing device 202 prior to provisioning module 106 placing download agent 205 and/or software from software package repository 122 within computing device 202, as discussed further below. Identification module 104 may identify computing device 202 during or after manufacture of computing device 202.

At step 304, one or more of the systems described herein may provide a network accessible software package repository. For example, at step 304 provisioning module 106 may, as part of computing device 202 in FIG. 2, provide network accessible software package repository 122.

Provisioning module 106 may provide software package repository 122 in any suitable manner. For example, provisioning module 106 may provide software package repository 122 in part by storing, maintaining, and/or providing access to one or more software packages within a database, such as database 120, and/or within a server, such as server 206. In the example of FIG. 2, network accessible software package repository 122 may include security package 211 and power package 212. One or more computing devices, such as computing device 202, may access network accessible software package repository 122 via network 204.

At step 306 one or more of the systems described herein may provide a download agent within the firmware updateable read only memory. For example, at step 306 provisioning module 106 may, as part of computing device 202 in FIG. 2, provide download agent 205 within read only memory 208 of computing device 202.

Provisioning module 106 may provide a number of different kinds of download agents and may provide one or more of them in a variety of manners, as explained below. Provisioning module 106 may provide download agent 205 within read only memory 208 during a manufacturing process of computing device 202 and/or read only memory 208. Provisioning module 106 may direct, instruct, and/or ensure that download agent 205 will be included within computing device 202 and/or read only memory 208 during a manufacturing process within a manufacturing center. Provisioning module 106 may specify that read only memory 208 should be (or will be) programmed in part to include download agent 205. Provisioning module 106 may also specify that read only memory 208 that already includes download agent 205 should be (or will be) included within computing device 202 (e.g., during a manufacturing process). Alternatively, or in addition, provisioning module 106 may provide download agent 205 within a refurbishing, maintenance, and/or repair operation (e.g., within a vendor, subsidiary, and/or contractor center such as a manufacturing, refurbishing, maintenance, and/or repair center). In general, provisioning module 106 may provide download agent 205 "out of the box" within a finished manufactured product prior to sale or use by a customer.

Provisioning module 106 may also provide download agent 205 after sale or use of computing device 202 and/or read only memory 208. Provisioning module 106 may provide download agent 205 to a computing device that was manufactured, produced, and/or released without download agent 205. Provisioning module 106 may provide download agent 205 over a network connection, such as network 204. Provisioning module 106 may prompt or direct the updating of read only memory 208 within computing device 202 to include download agent 205. Updating read only memory 208 may involve rebooting computing device 202, breaking an internet connection, creating a period of down time, and/or writing the entire space of read only memory 208.

Provisioning module 106 may provide download agent 205 to read only memory 208 over network 204 in response to detecting that computing device 202 and/or read only memory 208 lacks, requests (i.e., autonomously or manually by a user), needs, and/or may benefit from download agent 205. Provisioning module 106 may ping, or perform diagnostics on, computing device 202 and/or read only memory 208 to ascertain whether either contains download agent 205 (or whether computing device 202 is configured to perform part or all of the functionality described in this application, including creating a working space, extracting a software package, and/or executing the software package, as discussed below). Provisioning module 106 may also receive an indication of whether either computing device 202 or read only memory 208 contains download agent 205 from computing device 202 without provisioning module 106 first requesting the indication. Computing device 202 may autonomously provide information (including model information and state information about a state of hardware components, processor registers, primary and secondary memory, processes, and/or installed programs) that indicates whether computing device 202 contains download agent 205. Computing device 202 may provide the information continuously, according to a predetermined schedule, and/or on a fixed interval to server 206.

Provisioning module 106 may also provide download agent 205 without ascertaining that computing device 202 and/or read only memory 208 lacks download agent 205 and/or needs, requests, and/or would benefit from download agent 205. Provisioning module 106 may provide download agent 205 as part of an update to some, all, or substantially all devices within a specified type or model, or range of models or types, of computing device (i.e., all computing devices determined to share one or more attributes). Provisioning module 106 may also provide download agent 205 within an image to be written to read only memory within computing devices that already possess download agent 205 (e.g., because updating the read only memory involves writing the entire space of the read only memory).

As noted, download agent 205 may be programmed to create a working area in random access memory by emulating persistent storage, to install a software package to the working area, and to execute the software package in the working area.

Download agent 205 may be programmed to create a working area by emulating persistent storage in any suitable manner. For example, download agent 205 may be programmed to emulate persistent storage at least in part by creating a file system in random access memory 210. For example, download agent 205 may create file system 209 within working area 203 of random access memory 210. Creating file system 209 may enable software to be installed and executed within random access memory 210 as if the software were installed on traditional auxiliary memory, such as writable auxiliary memory 207 (i.e., even in the case that computing device 202 lacks writable auxiliary memory 207). Creating file system 209 may also enable software developers to develop software in a more hardware independent manner than developing firmware directly for read only memory 208 (which may involve more hardware specific software, programming languages, and/or commands, and thus involves more collaboration with a vendor of computing device 202 and/or read only memory 208). Download agent 205 may be programmed to create file system 209 using technology such as RAMFS, TMPFS, and/or a RAM disk.

Download agent 205 may access a software package in software package repository 122 before or after creating working area 203. For example, download agent 205 may be programmed to access software package repository 122 through network 204 to extract the software package upon computing device 202 being booted. Since random access memory 210 (i.e., volatile memory) may lose data upon being rebooted or losing power, download agent 205 may be programmed to download a software package every time (or sometimes or substantially all times) that computing device 202 is rebooted. Download agent 205 may download a software package from a location in software package repository 122 that computing device 202 shares with other computing devices having a same or similar type or model.

Download agent 205 and/or server 206 may be programmed to select a software package for random access memory 210 using a set of model-package correlations 218 that correlate device models with software packages. Download agent 205 may be programmed to download a software package from a location that may be unique to computing device 202. Server 206 and/or a remote client computing device may contain the download location. The client computing device may access a wide area (or other) network, such as the Internet, through computing device 202 (e.g., where computing device 202 constitutes a gateway). For example, computing device 202 (as a gateway or not as a gateway) may store all or part of one or more security packages within one or more client computing devices within a local area network. Storing data on a local area network may enable faster downloading of the software package than downloading the software package across a wide area network. Download agent 205 may also be programmed to store, download, and/or read the software package from within writable auxiliary memory 207.

Writable auxiliary memory 207 may perform reads and/or writes too slowly for proper, desirable, and/or optimal execution of the software package, but may serve as a storehouse that preserves the software package when random access memory 210 is rebooted or powered down. Computing device 202 may include this slower type of writable auxiliary memory 207 even if computing device 202 lacks a faster type of writable auxiliary memory 207, such as a hard disk.

Download agent 205 may be programmed to access software package repository 122 through network 204 to extract the software package by transmitting a request to software package repository 122. Download agent 205 may include a variety of information within the request. The request may include a status update (which may include state information, as discussed above), a self-identification message, a check for new or updated software or firmware, and/or a request for a specific software package or type of software package.

Server 206 may respond to a request for a software package in any of a variety of ways. In some embodiments, server 206 may select one or more packages to transmit to computing device 202 based on information provided by computing device 202. For example, if the request includes an identifier of a model of computing device 202, server 206 may use the identifier to select a software package from a plurality of software packages at the software package repository.

As another example, server 206 may provide, in response to a request for a software package, a list or inventory of multiple software packages available within software package repository 122, and computing device 202 may select one or more of the software packages to download. Additionally or alternatively, a human administrator may manually select one or more software packages, a schedule for downloading software packages, and/or criteria for downloading software packages.

The selection of software packages may be based on various criteria. One criterion may include whether computing device 202 or its user indicates a desire (e.g., sends a request) for the software package or its functionality. Another criterion may include a degree of importance or criticality (i.e., security criticality) assigned to the software package. Moreover, another criterion may include whether computing device 202 lacks the software packages and/or any earlier or later version of the software package. In addition, another criterion may include a degree of fit between the software package (i.e., its intended or target software, operating system, and/or hardware platforms) and the software, operating system, and/or hardware available at computing device 202.

In some embodiments, computing device 202 may set one or more flags that may be used to determine which software packages should be installed on computing device 202. For example, computing device 202 may autonomously, or with manual intervention by a human user, set one or more flags within a request or self-identification message or status message (or within internal memory for when server 206 pings computing device 202). The flag or message may indicate a model, state, and/or health of computing device 202. The flag or message may also indicate one or more types of software and/or functionality sought by computing device 202. For example, the flag or message may indicate whether to update software if newer software becomes available, whether computing device 202 seeks security software, operating software or firmware, and/or any other kind of software, etc.

Download agent 205 may be programmed to extract the software package, install the software package in working area 203 of random access memory, and execute the software package in working area 203 without rebooting computing device 202. Similarly, the steps of extracting the software package and executing the software package in working area 203 of random access memory 210 may be performed without breaking the connection to network 204.

Download agent 205 may be programmed to execute the software package in working area 203 of random access memory 210 to update or change functionality of computing device 202. For example, download agent 205 may download security package 211 and execute security package 211 within working area 203 to update security functionality of computing device 202.

Download agent 205 may be programmed to block at least some network traffic to computing device 202 until the software package begins executing in the working area of the random access memory that emulates persistent storage. Blocking network traffic may be particularly important in embodiments where the software package provides one or more network security functions for computing device 202. In general, download agent 205 may be programmed to block any kind of functionality, or one or more functional components, of computing device 202, until the software package reaches a predetermined level of functionality (e.g., full functionality). The blocked functionality may include transmitting and/or receiving messages within a wide area network and/or a local area network (i.e., either network on both sides of a gateway), functionality of buttons on computing device 202, functionality of light-emitting diodes (LEDs) and/or displays on computing device 202, and/or functionality of a user interface, as discussed further below.

Computing device 202 may be configured to provide a user interface where a user can configure settings for the computing device. The user interface may constitute a local area network settings configuration (i.e., hyper-text markup language (HTML) or functional equivalent) page for computing device 202 and/or a button and LED, light, and/or display interface directly on computing device 202. The settings may indicate how computing device 202 will respond when download agent 205 fails to download the software package from the software package repository. In particular, the settings may indicate a degree of functionality, and/or a list of functional components, to enable or block in the case that a software package cannot be downloaded and/or executed. For example, the settings may indicate whether to block functionality within a specified or predetermined period of time or after a number of attempts. The settings may also indicate whether to block functionality while the software package is being downloaded, installed, and/or configured. For example, at least some, all, or substantially all network or gateway functionality may be blocked if a (i.e., critical) security update cannot be executed. The settings may also indicate a timing, interval, date, and/or predetermined schedule for attempting to download one or more software packages (in general and/or of a specified type).

As explained above in connection with method 300 in FIG. 3, the systems and methods disclosed herein may enable a software vendor to efficiently and effectively update software in a computing system, such as a gateway, multiple times per day. The systems and methods disclosed herein may also enable the software vendor to update the computing system without rebooting or breaking a network connection of the computing system. In this manner, the embodiments described herein may address various inefficiencies and issues of traditional mechanisms for providing software packages to devices. For example, traditional mechanisms for delivering new firmware or other updates to gateways may involve significant engineering and quality assurance efforts. Delivering firmware may also involve collaboration between the gateway manufacturer and the software vendor, assuming they are different entities. These issues become major problems for security products that may be updated several times per day on a gateway, especially if the updates require internet connections to be broken. Embodiments of the instant disclosure may address these issues by providing a solution that enables software packages to be both pre-installed and updated frequently without rebooting a system or causing downtime for the system.

Figure 4:
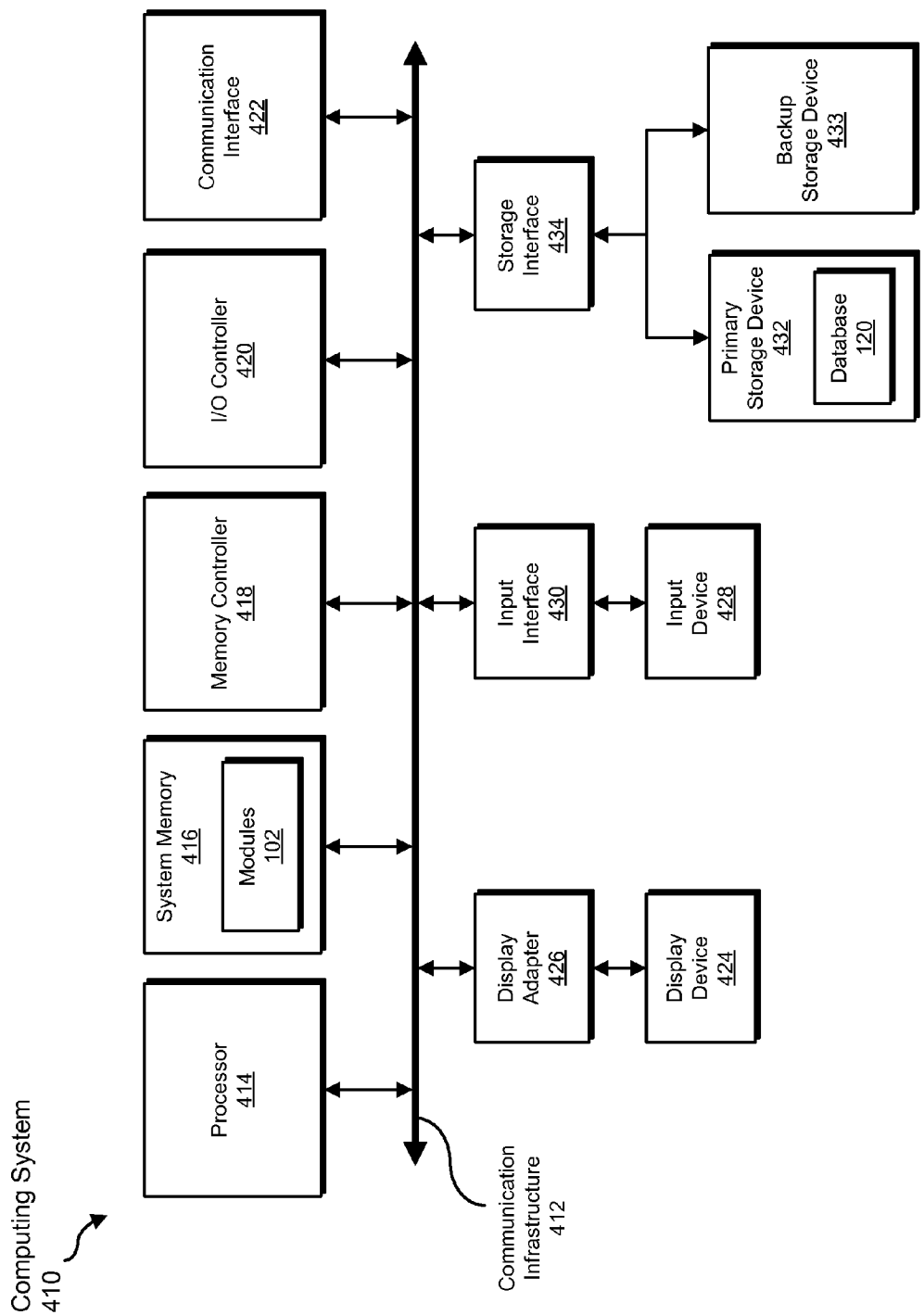
FIG. 4 is a block diagram of an exemplary computing system capable of implementing one or more of the embodiments described and/or illustrated herein.

FIG. 4 is a block diagram of an exemplary computing system 410 capable of implementing one or more of the embodiments described and/or illustrated herein. For example, all or a portion of computing system 410 may perform and/or be a means for performing, either alone or in combination with other elements, one or more of the steps described herein (such as one or more of the steps illustrated in FIG. 3). All or a portion of computing system 410 may also perform and/or be a means for performing any other steps, methods, or processes described and/or illustrated herein.

Computing system 410 broadly represents any single or multi-processor computing device or system capable of executing computer-readable instructions. Examples of computing system 410 include, without limitation, workstations, laptops, client-side terminals, servers, distributed computing systems, handheld devices, or any other computing system or device. In its most basic configuration, computing system 410 may include at least one processor 414 and a system memory 416.

Processor 414 generally represents any type or form of physical processing unit (e.g., a hardware-implemented central processing unit) capable of processing data or interpreting and executing instructions. In certain embodiments, processor 414 may receive instructions from a software application or module. These instructions may cause processor 414 to perform the functions of one or more of the exemplary embodiments described and/or illustrated herein.

System memory 416 generally represents any type or form of volatile or non-volatile storage device or medium capable of storing data and/or other computer-readable instructions. Examples of system memory 416 include, without limitation, Random Access Memory (RAM), Read Only Memory (ROM), flash memory, or any other suitable memory device. Although not required, in certain embodiments computing system 410 may include both a volatile memory unit (such as, for example, system memory 416) and a non-volatile storage device (such as, for example, primary storage device 432, as described in detail below). In one example, one or more of modules 102 from FIG. 1 may be loaded into system memory 416.

In certain embodiments, exemplary computing system 410 may also include one or more components or elements in addition to processor 414 and system memory 416. For example, as illustrated in FIG. 4, computing system 410 may include a memory controller 418, an Input/Output (I/O) controller 420, and a communication interface 422, each of which may be interconnected via a communication infrastructure 412. Communication infrastructure 412 generally represents any type or form of infrastructure capable of facilitating communication between one or more components of a computing device. Examples of communication infrastructure 412 include, without limitation, a communication bus (such as an Industry Standard Architecture (ISA), Peripheral Component Interconnect (PCI), PCI Express (PCIe), or similar bus) and a network.

Memory controller 418 generally represents any type or form of device capable of handling memory or data or controlling communication between one or more components of computing system 410. For example, in certain embodiments memory controller 418 may control communication between processor 414, system memory 416, and I/O controller 420 via communication infrastructure 412.

I/O controller 420 generally represents any type or form of module capable of coordinating and/or controlling the input and output functions of a computing device. For example, in certain embodiments I/O controller 420 may control or facilitate transfer of data between one or more elements of computing system 410, such as processor 414, system memory 416, communication interface 422, display adapter 426, input interface 430, and storage interface 434.

Communication interface 422 broadly represents any type or form of communication device or adapter capable of facilitating communication between exemplary computing system 410 and one or more additional devices. For example, in certain embodiments communication interface 422 may facilitate communication between computing system 410 and a private or public network including additional computing systems. Examples of communication interface 422 include, without limitation, a wired network interface (such as a network interface card), a wireless network interface (such as a wireless network interface card), a modem, and any other suitable interface. In at least one embodiment, communication interface 422 may provide a direct connection to a remote server via a direct link to a network, such as the Internet. Communication interface 422 may also indirectly provide such a connection through, for example, a local area network (such as an Ethernet network), a personal area network, a telephone or cable network, a cellular telephone connection, a satellite data connection, or any other suitable connection.

In certain embodiments, communication interface 422 may also represent a host adapter configured to facilitate communication between computing system 410 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 422 may also allow computing system 410 to engage in distributed or remote computing. For example, communication interface 422 may receive instructions from a remote device or send instructions to a remote device for execution.

As illustrated in FIG. 4, computing system 410 may also include at least one display device 424 coupled to communication infrastructure 412 via a display adapter 426. Display device 424 generally represents any type or form of device capable of visually displaying information forwarded by display adapter 426. Similarly, display adapter 426 generally represents any type or form of device configured to forward graphics, text, and other data from communication infrastructure 412 (or from a frame buffer, as known in the art) for display on display device 424.

As illustrated in FIG. 4, exemplary computing system 410 may also include at least one input device 428 coupled to communication infrastructure 412 via an input interface 430. Input device 428 generally represents any type or form of input device capable of providing input, either computer or human generated, to exemplary computing system 410. Examples of input device 428 include, without limitation, a keyboard, a pointing device, a speech recognition device, or any other input device.

As illustrated in FIG. 4, exemplary computing system 410 may also include a primary storage device 432 and a backup storage device 433 coupled to communication infrastructure 412 via a storage interface 434. Storage devices 432 and 433 generally represent any type or form of storage device or medium capable of storing data and/or other computer-readable instructions. For example, storage devices 432 and 433 may be a magnetic disk drive (e.g., a so-called hard drive), a solid state drive, a floppy disk drive, a magnetic tape drive, an optical disk drive, a flash drive, or the like. Storage interface 434 generally represents any type or form of interface or device for transferring data between storage devices 432 and 433 and other components of computing system 410. In one example, database 120 from FIG. 1 may be stored in primary storage device 432.

In certain embodiments, storage devices 432 and 433 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 432 and 433 may also include other similar structures or devices for allowing computer software, data, or other computer-readable instructions to be loaded into computing system 410. For example, storage devices 432 and 433 may be configured to read and write software, data, or other computer-readable information. Storage devices 432 and 433 may also be a part of computing system 410 or may be a separate device accessed through other interface systems.

Many other devices or subsystems may be connected to computing system 410. Conversely, all of the components and devices illustrated in FIG. 4 need not be present to practice the embodiments described and/or illustrated herein. The devices and subsystems referenced above may also be interconnected in different ways from that shown in FIG. 4. Computing system 410 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., Compact Disks (CDs) or Digital Video Disks (DVDs)), electronic-storage media (e.g., solid-state drives and flash media), and other distribution systems.

The computer-readable-storage medium containing the computer program may be loaded into computing system 410. All or a portion of the computer program stored on the computer-readable-storage medium may then be stored in system memory 416 and/or various portions of storage devices 432 and 433. When executed by processor 414, a computer program loaded into computing system 410 may cause processor 414 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 410 may be configured as an Application Specific Integrated Circuit (ASIC) adapted to implement one or more of the exemplary embodiments disclosed herein.

Figure 5:
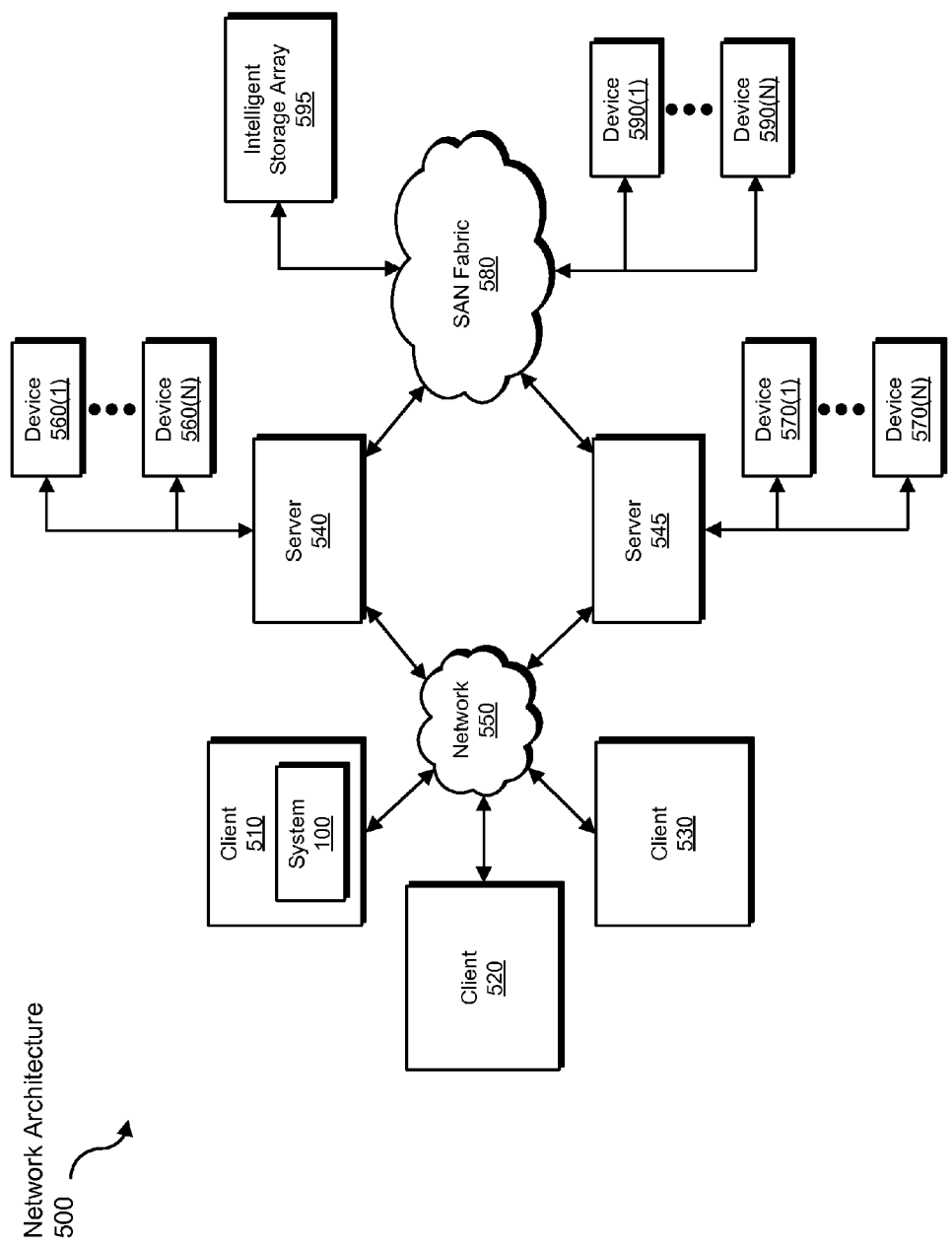
FIG. 5 is a block diagram of an exemplary computing network capable of implementing one or more of the embodiments described and/or illustrated herein.

FIG. 5 is a block diagram of an exemplary network architecture 500 in which client systems 510, 520, and 530 and servers 540 and 545 may be coupled to a network 550. As detailed above, all or a portion of network architecture 500 may perform and/or be a means for performing, either alone or in combination with other elements, one or more of the steps disclosed herein (such as one or more of the steps illustrated in FIG. 3). All or a portion of network architecture 500 may also be used to perform and/or be a means for performing other steps and features set forth in the instant disclosure.

Client systems 510, 520, and 530 generally represent any type or form of computing device or system, such as exemplary computing system 410 in FIG. 4. Similarly, servers 540 and 545 generally represent computing devices or systems, such as application servers or database servers, configured to provide various database services and/or run certain software applications. Network 550 generally represents any telecommunication or computer network including, for example, an intranet, a WAN, a LAN, a PAN, or the Internet. In one example, client systems 510, 520, and/or 530 and/or servers 540 and/or 545 may include all or a portion of system 100 from FIG. 1.

As illustrated in FIG. 5, one or more storage devices 560(1)-(N) may be directly attached to server 540. Similarly, one or more storage devices 570(1)-(N) may be directly attached to server 545. Storage devices 560(1)-(N) and storage devices 570(1)-(N) generally represent any type or form of storage device or medium capable of storing data and/or other computer-readable instructions. In certain embodiments, storage devices 560(1)-(N) and storage devices 570(1)-(N) may represent Network-Attached Storage (NAS) devices configured to communicate with servers 540 and 545 using various protocols, such as Network File System (NFS), Server Message Block (SMB), or Common Internet File System (CIFS).

Servers 540 and 545 may also be connected to a Storage Area Network (SAN) fabric 580. SAN fabric 580 generally represents any type or form of computer network or architecture capable of facilitating communication between a plurality of storage devices. SAN fabric 580 may facilitate communication between servers 540 and 545 and a plurality of storage devices 590(1)-(N) and/or an intelligent storage array 595. SAN fabric 580 may also facilitate, via network 550 and servers 540 and 545, communication between client systems 510, 520, and 530 and storage devices 590(1)-(N) and/or intelligent storage array 595 in such a manner that devices 590(1)-(N) and array 595 appear as locally attached devices to client systems 510, 520, and 530. As with storage devices 560(1)-(N) and storage devices 570(1)-(N), storage devices 590(1)-(N) and intelligent storage array 595 generally represent any type or form of storage device or medium capable of storing data and/or other computer-readable instructions.

In certain embodiments, and with reference to exemplary computing system 410 of FIG. 4, a communication interface, such as communication interface 422 in FIG. 4, may be used to provide connectivity between each client system 510, 520, and 530 and network 550. Client systems 510, 520, and 530 may be able to access information on server 540 or 545 using, for example, a web browser or other client software. Such software may allow client systems 510, 520, and 530 to access data hosted by server 540, server 545, storage devices 560(1)-(N), storage devices 570(1)-(N), storage devices 590 (1)-(N), or intelligent storage array 595. Although FIG. 5 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 540, server 545, storage devices 560(1)-(N), storage devices 570(1)-(N), storage devices 590(1)-(N), intelligent storage array 595, or any combination thereof. All or a portion of one or more of the exemplary embodiments disclosed herein may also be encoded as a computer program, stored in server 540, run by server 545, and distributed to client systems 510, 520, and 530 over network 550.

As detailed above, computing system 410 and/or one or more components of network architecture 500 may perform and/or be a means for performing, either alone or in combination with other elements, one or more steps of an exemplary method for executing a software package from within random access memory.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive a random access memory and/or read only memory to be transformed, transform the random access memory to include a software package and/or the read only memory to include a download agent, output a result of the transformation by executing the software, such as security software, within the random access memory, use the result of the transformation to protect a computing device such as a gateway, and store the result of the transformation to read only memory, random access memory, and/or persistent and/or auxiliary memory. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for executing a software package from within random access memory, at least a portion of the method being performed by a computing system comprising at least one processor, the method comprising:
    identifying a computing device that contains both random access memory and firmware updatable read only memory, the computing device being configured such that updating the firmware updatable read only memory involves rebooting the computing device;
    providing a network accessible software package repository;
    providing a download agent within the firmware updateable read only memory, the download agent being programmed to:
    create a working area within the random access memory by emulating persistent storage;
    access the software package repository through a network connection to extract a software package;
    execute the software package in the working area of the random access memory that emulates persistent storage, wherein the download agent is programmed to extract the software package and execute the software package in the working area of the random access memory that emulates persistent storage without rebooting the computing device.

2. The computer-implemented method of claim 1, wherein the computing device is configured without writable auxiliary memory.

3. The computer-implemented method of claim 1, wherein executing the software package in the working area of the random access memory that emulates persistent storage comprises updating a security software package.

4. The computer-implemented method of claim 1, wherein:
    the download agent is programmed to access the software package repository through the network connection to extract the software package by transmitting a request to the software package repository;
    the request comprises an identifier of a model of the computing device.

5. The computer-implemented method of claim 4, further comprising
    selecting the software package, based on the identifier of the model, from a plurality of software packages at the software package repository.

6. The computer-implemented method of claim 1, wherein the steps of extracting the software package and executing the software package in the working area of the random access memory are performed without breaking the network connection.

7. The computer-implemented method of claim 1, wherein the computing device comprises a network gateway.

8. The computer-implemented method of claim 1, wherein the download agent is programmed to access the software package repository through the network connection to extract the software package upon the computing device being booted.

9. The computer-implemented method of claim 1, wherein the download agent is programmed to emulate persistent storage at least in part by creating a file system in the random access memory.

10. The computer-implemented method of claim 1, wherein the download agent is programmed to block at least some traffic on the network through the computing device until the software package is executing in the working area of the random access memory that emulates persistent storage.

11. The computer-implemented method of claim 1, wherein:
    the computing device is configured to provide a user interface where a user can configure settings for the computing device;
    the settings indicate how the computing device will respond when the download agent fails to download the software package from the software package repository.

12. A system for executing a software package from within random access memory, the system comprising:
    an identification module that identifies a computing device that contains both random access memory and firmware updatable read only memory, the computing device being configured such that updating the firmware updatable read only memory involves rebooting the computing device;
    a provisioning module that:
    provides a network accessible software package repository;
    provides a download agent within the firmware updateable read only memory, the download agent being programmed to:
    create a working area within the random access memory by emulating persistent storage;
    access the software package repository through a network connection to extract a software package;
    execute the software package in the working area of the random access memory that emulates persistent storage;
    at least one processor configured to execute the identification module and the provisioning module,
    wherein the download agent is programmed to extract the software package and execute the software package in the working area of the random access memory that emulates persistent storage without rebooting the computing device.

13. The system of claim 12, wherein the computing device is configured without writable auxiliary memory.

14. The system of claim 12, wherein the download agent is programmed to execute the software package in the working area of the random access memory that emulates persistent storage by updating a security software package.

15. The system of claim 12, wherein:
    the download agent is programmed to access the software package repository through the network connection to extract the software package by transmitting a request to the software package repository;
    the request comprises an identifier of a model of the computing device.

16. The system of claim 12, wherein the download agent is programmed to extract the software package and execute the software package in the working area of the random access memory without breaking the network connection.

17. The system of claim 12, wherein the computing device comprises a network gateway.

18. The system of claim 12, wherein the download agent is programmed to access the software package repository through the network connection to extract the software package upon the computing device being booted.

19. The system of claim 12, wherein the download agent is programmed to emulate persistent storage at least in part by creating a file system in the random access memory.

20. A non-transitory computer-readable-storage medium comprising one or more computer-readable instructions that, when executed by at least one processor of a computing system, cause the computing system to:
    identify a computing device that contains both random access memory and firmware updatable read only memory, the computing device being configured such that updating the firmware updatable read only memory involves rebooting the computing device;

provide a network accessible software package repository;

provide a download agent within the firmware updateable read only memory, the download agent being programmed to:

create a working area within the random access memory by emulating persistent storage;

access the software package repository through a network connection to extract a software package;

execute the software package in the working area of the random access memory that emulates persistent storage, wherein the download agent is programmed to extract the software package and execute the software package in the working area of the random access memory that emulates persistent storage without rebooting the computing device.

\* \* \* \* \*